United States Patent
Jeong et al.

(12) 
(10) Patent No.: US 6,498,213 B2
(45) Date of Patent: Dec. 24, 2002

(54) THERMOPLASTIC RESIN COMPOSITION

(75) Inventors: Kie-Youn Jeong, Kyoungki-do (KR); Min Nam, Daejon (KR); Tae-Seung Lee, Kyoungki-do (KR)

(73) Assignees: Hyundai Motor Company, Seoul (KR); LG Chemical Co., Ltd., Seoul (KR)

( * ) Notice: Subject to any disclaimer, the term of this patent is extended or adjusted under 35 U.S.C. 154(b) by 0 days.

(21) Appl. No.: 09/864,432

(22) Filed: May 23, 2001

(65) Prior Publication Data

US 2001/0056159 A1 Dec. 27, 2001

(30) Foreign Application Priority Data

May 26, 2000 (KR) ........................................ 2000-28730

(51) Int. Cl.⁷ ........................... C08L 9/00; C08L 23/00; C08L 23/04; C08L 45/00
(52) U.S. Cl. ...................... 525/191; 525/216; 525/232; 525/240; 525/241; 524/424; 524/425; 524/426; 524/427; 524/445; 524/451; 524/500; 524/502; 524/505; 524/515; 524/543; 524/553; 524/556; 524/730
(58) Field of Search ................................ 525/191, 216, 525/232, 240, 241; 524/424, 425, 426, 427, 445, 451, 500, 502, 505, 515, 543, 553, 556, 730

(56) References Cited

U.S. PATENT DOCUMENTS

| | | | |
|---|---|---|---|
| 4,212,787 A | 7/1980 | Matsuda et al. | |
| 4,247,645 A | 1/1981 | Meijer-Hoffman et al. | . 435/262 |
| 4,311,528 A | 1/1982 | Dietz et al. | .................... 106/35 |
| 5,843,577 A | * 12/1998 | Ouhadi et al. | ........... 428/474.7 |
| 6,344,525 B1 | * 2/2002 | Lee et al. | ................. 525/330.2 |

FOREIGN PATENT DOCUMENTS

JP     48-26835     4/1973

* cited by examiner

*Primary Examiner*—Nathan M. Nutter
(74) *Attorney, Agent, or Firm*—Christie, Parker & Hale, LLP

(57) ABSTRACT

The present invention relates to a thermoplastic resin composition, more specifically to a thermoplastic resin composition with superior extrusion and calendar formability and directly coatable without using primer because the crosslinking density can be arranged to improve the physical and chemical properties of the composition and the solubility to the solvent is increased during the coating process by including processing oil, inorganic filler, crosslinking agent and crosslinking assistant in random polypropylene resin, highly-crystalline random polypropylene resin, highly-crystalline polyolefin resin, olefin copolymer rubber and low-density polyethylene resin. This thermoplastic resin composition may be suitable for the use as surface material of the inner parts of automobiles.

11 Claims, No Drawings

THERMOPLASTIC RESIN COMPOSITION

CROSS-REFERENCE TO RELATED APPLICATION

This application claims priority of Korea patent Application No. 2000-28730, filed on May 26, 2000.

BACKGROUND OF THE INVENTION

Field of the Invention

The present invention relates to a thermoplastic resin composition, more specifically to a thermoplastic resin composition with superior extrusion and calendar formability and directly coatable without using primer because the crosslinking density can be arranged to improve the physical and chemical properties of the composition and the solubility to the solvent is increased during the coating process by including processing oil, inorganic filler, crosslinking agent and crosslinking assistant in random polypropylene resin, highly-crystalline random polypropylene resin, highly-crystalline polyolefin resin, olefin copolymer rubber and low-density polyethylene resin. This thermoplastic resin composition may be suitable for the use as surface material of the inner parts of automobiles.

Conventionally, PVC, PVC/ABS alloy extrusion sheet or calendar processed sheet has been widely used for the automotive inner parts like the surface material of instrument panel, door trim panel and headlining, etc. This surface material for automotive inner parts should have good physical and chemical properties, particularly superior abrasion resistance, wear resistance, chemical resistance, solvent resistance and weather resistance. The surface coating should be carried out with not so much luster in order not to hinder the vision of the driver. Also, the color should harmonize with that of other parts.

Recently, researches to replace said surface material for automotive inner parts to olefin thermoplastic elastic material (hereunder referred to as "TPO") sheet, which is environmentally friendly and has good recyclability, lightweightness, fogging and odor, are actively being carried out. Because the TPO sheet has a nonpolar and highly-crystalline molecular structure, it has very poor adhesion property. Therefore, chlorinated polyolefin resin primer pre-treatment was required to secure sufficient film adhesion property.

Processing oil is included to enhance the processing of EPDM for said olefin TPO resin. However, the processing oil greatly reduces the calendar formability and secondary formability due to the low melt tension. If the content of the processing oil is reduced and the crosslinking density of EPDM with crosslinking structure is increased to improve the calendar formability, the surface becomes rough and embo sustainability worsens during the secondary processing such as vacuum forming. And, if the crosslinking density of EPDM with crosslinking structure is reduced, processing becomes impossible due to the adhesion to roll surface during the calendar processing.

U.S. Pat. Issue No. 4,247,645 discloses a method of diluting pre-crosslinked EPDM rubber in polypropylene resin with good fluidity. However, this method does not provide sufficient crosslinking density and the elastic and mechanical properties worsen. So, it is not suitable for processing structures with complicated shape such as instrument panel and door trim panel. Also, the equipment and production cost related with the crosslinking process and diluting process are problems. Especially, high-tech equipments with excellent mixing property are required in the diluting process. Japanese Patent Publication No. Sho 48-26835 discloses a heat treatment method using peroxide after completely melting-mixing polypropylene resin and EPDM rubber. This method has a disadvantage of low calendar formability because sufficient crosslinking density and viscosity are hardly obtained during the calendar processing due to the overdecomposition of polypropylene resin and partial crosslinking of EPDM. U.S. Pat. Issue No. 4,311,528 discloses a method of completely crosslinking EPDM rubber using phenol crosslinking agent. This method provides superior elastic and mechanical properties compared with the crosslinking reaction using peroxide crosslinking agent due to the good crosslinking density and crosslinking rubber particle formation. However, the cost of the final product increases because the crosslinking agent is very expensive. U.S. Pat. Issue No. 4,212,787 discloses a non-crosslinking polyisobutylene (PIB) and butyl rubber (BR) which provide better shear effect of EPDM/polypropylene composition. Although this method provides somewhat uniform EPDM crosslinking density, the crosslinking density of the final product is insufficient for the calendar processing.

SUMMARY OF THE INVENTION

In order to solve said problems, the inventors prepared a thermoplastic resin composition by mixing processing oil with olefin copolymer rubber and then including random polypropylene resin, highly-crystalline polyolefin resin, low-density polyethylene resin, inorganic filler, peroxide crosslinking agent and crosslinking assistant.

This thermoplastic resin composition maintains the crosslinking density by using low-density polyethylene resin and random polypropylene resin during the crosslinking reaction of EPDM/polypropylene composition with peroxide. Also, by increasing the solubility to the solvent during coating so that non-crosslinking component of EPDM increases, a thermoplastic resin composition with good extrusion and calendar formability and directly coatable without primer treatment process. Therefore, the present invention was completed.

Accordingly, an object of the present invention is to provide a thermoplastic resin composition with good extrusion and calendar formability and directly coatable without primer treatment process.

DETAILED DESCRIPTION OF THE INVENTION

The present invention is characterized by a thermoplastic resin composition which comprises:
(A) 5–45wt % of random polypropylene resin;
(B) 5–80wt % of highly-crystalline polyolefin resin;
(C) 5–80wt % of olefin copolymer rubber;
(D) 5–30wt % of processing oil;
(E) 1–15wt % of low-density polyethylene resin;
(F) 2–15wt % of inorganic filler;
(G) 0.02–5 wt % of peroxide crosslinking agent to 100 wt % sum of components (A)–(F); and
(H) Less than 5 wt % of crosslinking assistant to 100 wt % sum of components.

Hereunder is given more a detailed description of the present invention.

The thermoplastic resin composition of the present invention has very good formability, physical property and chemical property. So, it is suitable for use as automotive inner parts.

Each component comprising the thermoplastic resin composition of the present invention is as follows.

(A) Random polypropylene resin

Firstly, the random polypropylene resin is an atactic polymer prepared from the propylene and a-olefin monomer block or random copolymer. For a-olefin monomer used in the copolymerization, ethylene, propylene, 1-butene, 1-pentene or 1-hexene may be used. In the present invention, the melt index (230° C., 2160 g) is recommended to be 0.1–40 g/10 min, and preferably 5–20 g/10 min. If the melt index is outside this range, the fluidity and viscosity become excessive or insufficient, so that calendar processing becomes poor. The random polypropylene resin is used in the range of 5–45 wt % to the resin composition excluding crosslinking agent and crosslinking assistant. Outside this range, the physical properties of the final product worsen.

(B) Highly-crystalline polyolefin resin

The highly-crystalline polyolefin resin is an isotactic or syntheotactic polymer prepared from crystalline propylene monopolymer or α-olefin monomer and propylene block or random copolymer. For α-olefin monomer used in the copolymerization, ethylene, propylene, 1-butene, 1-pentene or 1-hexene can be used. In the present invention, the melt index (230° C., 2160 g) is recommended to 0.1–60 g/10 min, and preferably 0.5–30 g/10 min. If the melt index is outside this range, the fluidity and viscosity become excessive or insufficient, so that calendar processing becomes poor. The highly-crystalline polyolefin resin is used in the range of 5–80 wt % to the resin composition excluding crosslinking agent and crosslinking assistant. Outside this range, the physical properties of the final product worsen.

(C) Olefin copolymer rubber

The olefin copolymer rubber is an amorphous random copolymer obtained by copolymerizing two or more kinds of monoolefin, and preferably a ethylene-propylene-diene ternary copolymer rubber with ethylene and propylene as main components. For ternary copolymer, dicyclopentadiene, 1,4-hexadiene, methylenenobodene, ethylidenenobornene cyclohexadiene or derivative thereof are recommended to be used in order to unsaturate the olefin copolymer rubber. Among these, ethylene-propylene-ethylidenenorbornene copolymer is mainly used. The olefin copolymer rubber is used in the range of 5–80 wt % to the resin composition excluding crosslinking agent and crosslinking assistant. Below this range, the crosslinking density lowers, so that the processing due to the adhesion of resin to the roll surface is hindered. Above this range, the crosslinking density increases, so that the embo sustenance during the secondary processing may worsen.

(D) Processing oil

The processing oil is used to improve the calendar formability. Paraffin mineral oil with 300–580° C. of ignition temperature is recommended. The processing oil is used in the range of 5–30 wt % to the resin composition excluding crosslinking agent and crosslinking assistant. Below this range, the surface of the composition becomes rough.

(E) Low-density polyethylene resin

For the low-density polyethylene resin, copolymer of ethylene and comonomer is used. The melt index (190° C. 2.16 kg) is recommended to be larger than 1 g/10 min, and preferably larger than 3 g/10 min. If the melt index of the low-density polyethylene resin is low, the fluidity lowers and the surface becomes rough because of the crosslinked gel elastic polymer. For the comonomer, 1-butene, 1-pentene or 1-hexene can be used. The low-density polyethylene resin is used in the range of 1–15 wt % to the resin composition excluding crosslinking agent and crosslinking assistant. Outside this range, the physical properties of the final product worsen.

(F) Inorganic filler

For the inorganic filler, talc, silica, calcium carbonate, clay or carbon black can be used. The one with 1–30 μm (preferably, 5–10 μm) of average particle size provides a good physical property. The inorganic filler is used in the range of 2–15 wt % to the resin composition excluding crosslinking agent and crosslinking assistant. Below this range, the physical property is not improved; and above this range, it becomes economically inefficient.

(G) Peroxide crosslinking agent

For the peroxide crosslinking agent, benzoyl peroxide, lauryl peroxide, dicumyl peroxide, 1,3-bis(t-butylperoxyisopropyl)benzene, di-t-butyl peroxide, 2,5-dimethyl-2,5-di(t-butylperoxyl)hexane, 2,5-dimethyl-2,5-di (t-butylperoxyl)hexane-3, p-chlorobenzol peroxide, n-butyl-4,4-bis(t-butylperoxy)valerate or 2,4-dichlorobenzoyl peroxide can be used. Among these, 1,3-bis (t-butylperoxyisopropyl)benzene is best in terms of odor and scorch stability. The content can be adjusted according to the crosslinking degree and fluidity. The effective content is 0.02–5 wt % to 100 wt % sum of the components (A)–(F). Below this range, the crosslinking density becomes low, so that the physical property and the formability become poor. Above this range, it becomes economically inefficient and the solubility to the solvent lowers, so that the coating property worsens. Also, the crosslinking agent should be made with peroxide master batch in order to prevent the decomposition of propylene due to the peroxide decomposition during the heat treatment of the peroxide organic compound.

(H) Crosslinking assistant

For the crosslinking assistant, the one which can prevent the excessive decomposition of the polypropylene resin and stabilize the formed radical is used. In the present invention, divinylbenzene, ethylene glycol dimethacrylate, triarylcyanurate, diethylene glycol dimethacrylate, arylmethacrylate or trimethylolpropanetrimethacrylate can be used. Among these, triarylcyanurate is the most effective. The content of the crosslinking assistant, which is adjustable, is less than 5 wt % to 100 wt % sum of the components (A)–(F). Outside this range, the stability of the formed radical is not maintained.

Other additives can be used if necessary. For example, general additives like common antioxidant, UV stabilizer, heat stabilizer, colorant and inorganic filler can be used in the range not influencing the thermal decomposition of peroxide.

The preparing method of the thermoplastic resin of the present invention from said components is not limited particularly. A common preparing process of polypropylene is mixing, pelletizing and extruding the source resins to form the final product. For the mixing extruding equipment, the one with relatively good mixing effect such as banbury kneader, double-axis extruder and booth kneader can be used. However, a continuous extrusion equipment is recommended rather than a batch-type mixing equipment because the continuous preparing exerts a great effect on the final product. Especially, required properties and uniformity can be obtained if mixing and heat treatment is performed in a single-axis or double-axis extruder and booth kneader heated to 130–280° C. under high shear stress. It is recommended to adjust the temperature within the range of 190–250° C. considering the residing time for the reaction to be completed.

Another characteristic of the present invention is a direct coating treatment method of the prepared thermoplastic resin composition without primer treatment. The thermoplastic resin composition of the present invention is characteristic in the introduction of olefin resin compatible with EPDM and polypropylene and enhancing the crosslinking density and the crosslinking reaction using crosslinking agent in order to increase the specific crosslinking content. Resultantly, the thermoplastic resin composition of the present invention provides good extrusion and calendar formability due to the increased solubility to the solvent during the coating process, and direct coating is possible without the primer treatment process.

Hereunder is given a detailed description of the present invention using examples. However, it should not be construed as limiting the scope of the present invention.

Materials and their properties used in the examples are as follows.

1. RB-1: Thermoplastic elastic polymer prepared by the heat treatment of EPDM and oil under shear stress.
2. Random propylene resin-1: Atactic polypropylene with 8 g/10 min of melt index (230° C., 2160 g).
3. Random propylene resin-2: Atactic polypropylene with 25 g/10 min of melt index (230° C., 2160 g).
4. EPDM: Ethylene-propylene-ethylidene-nobornene ternary copolymer rubber with 65/35 composition of ethylene/propylene, ML1+8, 127° C.=55 of Mooney viscosity, and 10 of iodine value.
5. Highly-crystalline polyolefin resin: Highly-crystalline polypropylene resin with 30 g/10 min of melt index (230° C., 2160 g).
6. Organic peroxide: Akzo Chemical's Perkadox 14–40 with 40/60 of 1,3-bis(t-butyl)peroxyisopropylbenzene/$CaCO_3$ content.
7. Crosslinking assistant: Akzo Chemical's Perkalink 301–40 with 50/50 of trialkylisocyanurate/silica content.

EXAMPLES 1–4

Thermoplastic resin composition was prepared according to the following Table 1. 43 wt % of EPDM and 7 wt. % of processing oil was mixed for 10 min in a preheated banbury kneader with the preblend method. Then, other components were mixed, dry-blended and pelletized by extruding in a double-axis extruder (W&P 40Φ) with the barrel temperature adjusted to 200–240° C.

Test Example

The thermoplastic resin composition prepared form Examples 1–4 was manufactured in sheet form in a 8-inch roll mill at 200° C. Then, physical properties were tested via following methods. The result is shown in Table 1.

1. Tensile rupture strength ($kg/cm^2$) and rupture elasticity (%): Dumbbell type 1 was tested at the test speed of 200 mm/min according to Art. 3 of JIS K6301.
2. Roll mill formability: The roll adhesion property of the roll mill sheet processed at 200° C. was measured.
3. Light resistance: After illuminating UV carbon arc class 1 (black panel, 88±3° C.) regulated in Art. 5.5 of FADE-O-METER JIS D0205 for 300 hr, visual inspection was performed and the discoloration was rated according to KS K0911 Grey Scale.
4. Heat resistant cyclability: After keeping the sample for 168 hr in a constant-temperature bath maintained at 110±2° C., it was let alone for 1 hr at room temperature and the visual inspection was performed.
5. Alkali resistance: The sample was dipped in 0.1N NaOH solution for 6 hr at 55±2° C., and then washed with water and dried with air. After 1 hr at room temperature, the visual inspection was performed.
6. Acid resistance: The sample was dipped in 0.1N $H_2SO_4$ solution for 6 hr at 55±2° C., and then washed with water and dried with air. After 1 hr at room temperature, the visual inspection was performed.
7. Initial adhesion property: 11 parallel lines with 1 mm intervals were drawn longitudinally and laterally to give 100 square grids according to KS M5918. After completely attaching cellophane tape and then taking it off, the number of intact grids were counted.
8. Moisture resistance: After keeping the sample in the saturated water vapor at 50±2° C. and 98±2% of RH for 240 hr, it was let alone for 1 hr at room temperature. Then, the visual inspection was performed.
9. Initial luster: 60° mirror luster was measured according to Test Method 3312 of KS M5000.
10. Outer Appearance: Defects like bulging, bubble, spot, coating stain, peeling (Orange Peel) and crack was observed visually in the condition of higher than 3001× of illuminance, higher than 0.8 of fixed vision and 300 mm of silent distance.

TABLE 1

|  |  | Examples | | | |
|---|---|---|---|---|---|
|  |  | 1 | 2 | 3 | 4 |
| Composition (wt %) | RB-1 | 50 | 50 | 50 | 50 |
|  | Highly-crystalline polyolefin resin | 10 | 35 | — | 10 |
|  | Random polypropylene rubber-1 | 25 | — | 35 | — |
|  | Random polypropylene rubber-2 | — | — | — | 25 |
|  | Low-density polyethylene resin | 10 | 10 | 10 | 10 |
|  | Inorganic filler | 5 | 5 | 5 | 5 |
| Weight Percent | Organic peroxide[1] | 1.5 | 1.5 | 1.5 | 1.5 |
|  | Crosslinking assistant[2] | 0.3 | 0.3 | 0.3 | 0.3 |
| Physical Properties | Tensile rupture strength ($kg/cm^2$) | 102 | 121 | 92 | 95 |
|  | Rupture elasticity (%) | 600↑ | 500 | 600 | 600 |
|  | Roll mill formability (adhesion) | None | None | None | None |
|  | Light resistance | ○ | ○ | ○ | ○ |
|  | Heat resistance cyclability | ○ | ○ | ○ | ○ |
|  | Accelerated weather resistance | ⊙ | ⊙ | ⊙ | ⊙ |
|  | Gasoline resistance | ⊙ | ⊙ | ⊙ | ⊙ |
|  | Alkali resistance | ⊙ | ⊙ | ⊙ | ⊙ |
|  | Acid resistance | ⊙ | ⊙ | ⊙ | ⊙ |
| Coating Properties | Initial adhesion property | ⊙ | ⊙ | ⊙ | ⊙ |
|  | Moisture resistance | ○ | ○ | ○ | ○ |
|  | Initial Luster | ⊙ | ⊙ | ⊙ | ⊙ |
|  | Outer Appearance | ○ | Δ | ○ | ○ |

[1] With the content of the above components set as 100 wt %.
[2] With the content excluding inorganic filler set as 100 wt %.
Test result: ⊙-Excellent, ○-Good, Δ- Rather poor.

As explained above, a thermoplastic resin composition comprising polypropylene resin, highly-crystalline polyolefin resin, olefin copolymer rubber and low-density polyethylene resin including processing oil, inorganic filler, crosslinking agent and crosslinking assistant was prepared. The thermoplastic resin composition prepared from the present invention has superior extrusion, calendar formability and increased solubility to the solvent during coating via adjustment of the crosslinking density. Especially, the surface property is superior, so that direct coating is possible without primer treatment. The thermoplastic resin composition prepared by the present invention can be applied suitably for automotive inner parts.

What is claimed is:

1. A thermoplastic resin composition which comprises:
   (A) 5–45 wt % of random polypropylene resin;
   (B) 5–80 wt % of highly-crystalline polyolefin resin;
   (C) 5–80 wt % of olefin copolymer rubber;
   (D) 5–30 wt % of processing oil;
   (E) 1–15 wt % of low-density polyethylene resin;
   (F) 2–15 wt % of inorganic filler; and
   (G) less than 0.02–5 wt % of peroxide crosslinking agent to 100 wt % sum of said components (A)–(F).

2. The thermoplastic resin composition according to claim 1, wherein said random polypropylene resin (A) is an atactic polymer with 0.1–40 g/10 min of melt index prepared from a block with α-olefin monomer or random copolymer.

3. The thermoplastic resin composition according to claim 1, wherein said highly-crystalline polyolefin resin (B) is an isotactic or syntheotactic polymer which is a crystalline propylene monopolymer or block of α-olefin monomer and propylene.

4. The thermoplastic resin composition according to claim 3, wherein said α-olefin monomer is selected from the group consisting of ethylene, propylene, 1-butene and 1-pentene.

5. The thermoplastic resin composition according to claim 1, wherein said olefin copolymer rubber (C) is ethylene-propylene-diene ternary copolymer rubber.

6. The thermoplastic resin composition according to claim 1, wherein said processing oil (D) is a paraffin mineral oil with 300–580° C. of ignition temperature.

7. The thermoplastic resin composition according to claim 1, wherein said low-density polyetheneresin (E) is a copolymer of α-olefin monomer with melt index higher than 1 g/10 min.

8. The thermoplastic resin composition according to claim 7, wherein said α-olefin monomer is selected from the group consisting of 1-butene, 1-pentene and 1-hexene.

9. The thermoplastic resin composition according to claim 1, wherein said inorganic filler (F) is one or more materials selected from the group consisting of talc, silica, calcium carbonate, calcium silicate, clay and carbon black.

10. The thermoplastic resin composition according to claim 1, wherein said peroxide crosslinking agent (G) is selected from benzoyl peroxide, lauryl peroxide, dicumyl peroxide, 1,3-bis(t-butylperoxyisopropyl)benzene, di-t-butyl peroxide, 2,5-dimethyl-2,5-di(t-butylperoxyl)hexane, 2,5-dimethyl-2,5-di(t-butylperoxyl)hexane-3, p-chlorobenzol peroxide, n-butyl-4,4-bis(t-butylperoxy)valerate or 2,4-dichlorobenzoyl peroxide.

11. The thermoplastic resin composition according to claim 1, wherein said crosslinking assistant (H) is selected from divinylbenzene, triarylcyanurate, ethylene glycol dimethacrylate, diethylene glycol dimethacrylate, trimethylolpropanetrimethacrylate or arylmethacrylate.

* * * * *